(12) United States Patent
Young et al.

(10) Patent No.: US 8,242,930 B2
(45) Date of Patent: Aug. 14, 2012

(54) INTELLIGENT VEHICLE DASHBOARD

(76) Inventors: Neil Young, Los Angeles, CA (US);
Larry Johnson, Los Angeles, CA (US);
Ben Johnson, legal representative,
Altadena, CA (US); Paul Perrone,
Charlottesville, VA (US)

( * ) Notice: Subject to any disclaimer, the term of this patent is extended or adjusted under 35 U.S.C. 154(b) by 345 days.

(21) Appl. No.: 12/605,819

(22) Filed: Oct. 26, 2009

(65) Prior Publication Data

US 2011/0084849 A1     Apr. 14, 2011

Related U.S. Application Data

(60) Provisional application No. 61/108,135, filed on Oct. 24, 2008.

(51) Int. Cl.
*G08C 19/00*     (2006.01)

(52) U.S. Cl. .................. 340/870.01; 340/438; 340/461; 340/539.13; 340/426.1; 455/73; 455/39; 455/403

(58) Field of Classification Search ............. 340/870.01, 340/438, 461, 426.1, 539.13; 455/73, 39, 455/403; 701/36
See application file for complete search history.

(56) References Cited

U.S. PATENT DOCUMENTS

| | | | | |
|---|---|---|---|---|
| 5,987,381 A | * | 11/1999 | Oshizawa | 701/427 |
| 6,121,692 A | * | 9/2000 | Michaels et al. | 307/10.1 |
| 6,359,554 B1 | * | 3/2002 | Skibinski et al. | 340/438 |
| 6,804,525 B2 | * | 10/2004 | Davis et al. | 455/456.1 |
| 7,881,483 B2 | * | 2/2011 | Masuda et al. | 381/163 |
| 7,957,735 B1 | * | 6/2011 | Lee et al. | 455/431 |
| 2009/0250276 A1 | | 10/2009 | Goodwin et al. | |

* cited by examiner

*Primary Examiner* — Lam T Mai

(74) *Attorney, Agent, or Firm* — Sandra P. Thompson; Buchalter Nemer

(57) ABSTRACT

A two-way vehicle communication system has been developed that includes at least one vehicle, at least one vehicle data collection point, at least one operations data supply system, and at least one data communication system, wherein the data communication system is operatively coupled to the at least one vehicle, the at least one vehicle data collection point, the at least one operations data supply system or a combination thereof. A method of monitoring a vehicle using a two-way vehicle communication system has been developed that includes: providing at least one vehicle, providing at least one vehicle data collection point, providing at least one operations data supply system, and providing at least one data communication system, wherein the data communication system is operatively coupled to and communicates with the at least one vehicle, the at least one vehicle data collection point, the at least one operations data supply system or a combination thereof.

12 Claims, 1 Drawing Sheet

INTELLIGENT VEHICLE DASHBOARD

This United States Utility application claims priority to U.S. Provisional Application Ser. No. 61/108,135 filed on Oct. 24, 2008, which is commonly-owned and incorporated herein in its entirety.

FIELD OF THE SUBJECT MATTER

The field of the subject matter is an intelligent vehicle dashboard capable of at least one-way communication, and in some embodiments two-way communications, between a vehicle and a media source.

BACKGROUND

Vehicle designs have traditionally been tailored to give information or feedback to the driver or operator, while the vehicle is in operation. In recent years, automobile makers have designed systems whereby the car can "communicate" through a standard electronic mail ("E-mail") alert to the car owner or dealership regarding the general maintenance schedule for the car, a new problem or device failure on the car or another related issue. The "OnStar" system is a system found on some automobiles whereby the operator can communicate with a technician or emergency services personnel regarding operation of the car.

As vehicle systems evolve, there is a growing need for "non-vehicle operators" to monitor and interact with the vehicle. For example, parents may want to monitor an automobile when their children are driving, vehicle designers may want to monitor the vehicle operations during testing or normal every day use, companies may want to monitor company-owned or operated vehicles during operation for liability and information purposes, along with other related uses.

SUMMARY

A two-way vehicle communication system has been developed that includes at least one vehicle, at least one vehicle data collection point, at least one operations data supply system, and at least one data communication system, wherein the data communication system is operatively coupled to the at least one vehicle, the at least one vehicle data collection point, the at least one operations data supply system or a combination thereof.

A method of monitoring a vehicle using a two-way vehicle communication system has been developed that includes: providing at least one vehicle, providing at least one vehicle data collection point, providing at least one operations data supply system, and providing at least one data communication system, wherein the data communication system is operatively coupled to and communicates with the at least one vehicle, the at least one vehicle data collection point, the at least one operations data supply system or a combination thereof.

DETAILED DESCRIPTION

A new system has been developed that addresses many of the concerns expressed, along with addressing the need for increased intelligent monitoring. In addition, a contemplated intelligent dashboard system can be used during racing and car development to monitor vehicle systems and indicators.

Figure 1:
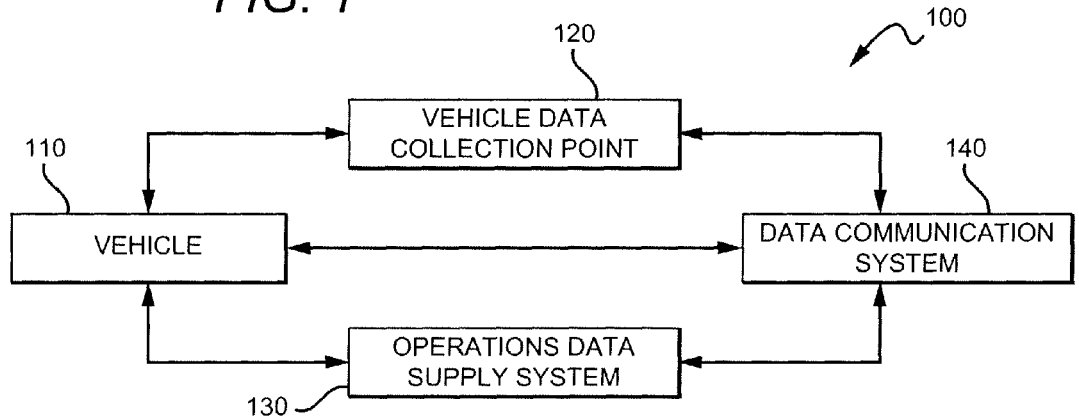
FIG. 1, a two-way vehicle communication system 100 has been developed that includes at least one vehicle 110, at least one vehicle data collection point 120, at least one operations data supply system 130, and at least one data communication system 140, wherein the at least one data communication system 140 is operatively coupled to the at least one vehicle 110, the at least one vehicle data collection point 120, the at least one operations data supply system 130 or a combination thereof.

Specifically, and as shown in FIG. 1, a two-way vehicle communication system 100 has been developed that includes at least one vehicle 110, at least one vehicle data collection point 120, at least one operations data supply system 130, and at least one data communication system 140, wherein the at least one data communication system 140 is operatively coupled to the at least one vehicle 110, the at least one vehicle data collection point 120, the at least one operations data supply system 130 or a combination thereof.

A contemplated vehicle communication system is a two-way system that allows one or more vehicles to communicate with at least one vehicle data collection point and ultimately a data communication system, which may include a computer, handheld device, software system, network system, the Internet or a combination thereof. As the vehicle communicates with the vehicle data collection point, a plurality of performance data is collected from the vehicle, or multiple vehicles, in order to provide useful information to the user of the central data collection point or to another project or collection system. In another embodiment, the at least one vehicle data collection point communicates with the at least one data communication system in order to provide vehicle-specific data from the vehicle to the data communication system or from the data communication system to the vehicle.

A contemplated data communication system may also have sufficient software or saved algorithms to allow the raw vehicle data to be processed to provide useful information to a driver, a researcher or another user. This processed information will allow the driver, researcher or other user to then use the data communication system to communicate back to the vehicle regarding wear-and-tear, fuel consumption, battery life, temperature control and other vehicle operations.

Contemplated data, once collected by a contemplated vehicle data collection point, can be displayed—either in its raw form or after processing by the vehicle data collection point or the data communication system—to users of a particular handheld device application, Internet website or other communications portal. In addition, the data can be used to help researchers who may be studying the vehicles design, operations and/or systems.

A contemplated system can also supply information to the vehicle and it's operator through an operations data supply system. For example, if the vehicle needs to refill on fuel or needs to charge the electric system, a contemplated vehicle communication system will determine where the vehicle is on the map, review available fuel or charging sites, and communicate that information to the vehicle for use. This functionality of contemplated systems is what provides the two-way communication between the vehicle and the data collection point or system.

Another feature of a contemplated vehicle communication system is the ability of the system to control the operations of the vehicle. For example, if the vehicle is a hybrid, solar or electric fueled vehicle, the vehicle communication system can communicate to the vehicle's operation system in order to increase the efficiency of the vehicle's fuel system. Such a two-way system would be useful in a vehicle similar to that disclosed in U.S. Utility application Ser. No. 12/370,380 filed on Feb. 12, 2009 and having a priority date of Feb. 13, 2008. This feature is normally controlled by a contemplated data communications system. It is contemplated that the data communication system comprises software, hardware or a combination thereof wherein the vehicle communication system and the vehicle can communication with one another. In some contemplated embodiments, an operations data supply system comprises information regarding the fuel system, the computer system, the operations system or a combination thereof. An operations data supply system can also monitor vehicle operations, such as tire pressure and lifetime, available shading systems for windows to reduce indoor heat during operation, power routing to different vehicle components during different stages of operation, internal wireless routers for cell phone and other communications use during operation or long distance travel, engaging or de-engaging aerodynamic components of the vehicle during use, and other vehicle operations.

Contemplated two-way vehicle communication systems may be utilized with any type of motorized vehicle, including a hybrid vehicle, a solar vehicle or an electric vehicle. A contemplated two-way vehicle communication system may be located in whole or in part on the at least one vehicle or in another remote location. For example, during a road race, at least part, if not all, of the two-way vehicle communication system may be located on a tracking vehicle or in the subject vehicle. The evolution of wireless communications systems should make it clear that a contemplated two-way vehicle communication system can be located in one or more locations, including the subject vehicle, and be fully operational.

A method of monitoring a vehicle using a two-way vehicle communication system has also been developed that includes: providing at least one vehicle, providing at least one vehicle data collection point, providing at least one operations data supply system, and providing at least one data communication system, wherein the data communication system is operatively coupled to and communicates with the at least one vehicle, the at least one vehicle data collection point, the at least one operations data supply system or a combination thereof.

EXAMPLES

Example 1

LincVolt™ Intelligent Dashboard Design (LID)

The LincVolt™ Intelligent Dashboard Design or "LID", which is a system that utilizes a contemplated two-way vehicle communication system disclosed herein, can be connected to any interactive medium, including the Internet, a hand-held device, an interactive gaming system or any other suitable interactive system. In this embodiment, the LID is connected to the internet and a web site keeps track of the history of the vehicle with all of the vehicle sensors reporting in "live" to a web site.

An application or group of applications at the site, using the data collection system, creates graphs and stats that represent the state of the vehicle's energy use and storage systems as well as other systems of the car. A history of the vehicle's life is gathered, stored, and the information viewed on the web site in easy to understand graphs and tables. This example shows how the two-way vehicle communication system can be utilized.

Primary Modes of Operation:
Rest
 The vehicle is turned off.
Commuter
 The vehicle is traveling on a full charge and has not required the generator to recharge the batteries or onboard energy storage. Range approx 80 miles in Commuter mode.
Planet Saver
 The vehicle is stationary, and plugged into a house or other receiver/sender of power. It either receives power (see LES) or generates enough to recharge the vehicle batteries and power the house (power receiver).
Long Ranger
 The vehicle is underway and the trip is more than the Commuter mode can handle, so the generator has automatically been activated by the LID, and moving into Long Ranger mode. This mode of the generator cycling on to recharge, then off as charging is completed, continues until the vehicle is both stationary and fully charged. At that point the LID returns the vehicle to Commuter mode.

Also, in Long Ranger mode, the car "knows" or can intelligently discern what the most economical fuel to purchase is in that area, and then can recommend different fueling outlets—according to economy or other fuel and service factors/preferences—set by the user. The GPS map indicates the location of closest preferred fueling either as the car moves down the road, or is stationary.

Service centers for electric vehicles may also be another candidate for this use. For example, if a driver is in trouble, the car can call ahead to the service center for help and enable the service center to review the car's record on it's website. The service professionals may then begin analyzing the vehicle problem before even seeing the vehicle roll into the service facility.

Failure
 There is a malfunction with the vehicle operation system that may be minor or fatal to the operation of the vehicle.
LincVolt™/"Life" Energy Saver (LES)
 In Planet Saver Mode, with the vehicle stationary and plugged into a house, the two-way vehicle communication system using the LID and LES know where the car is, what the price of fuel is at that location, what the best fuel by price is at that location, what the cost of energy from the grid is at that location, and other related data, and decides whether to power the home from the vehicle or have the home recharge the vehicle's onboard power storage system with grid power.

Example 2

Eco-Feedback Indicator

The Progressive Automotive™ X Prize is fostering a wide variety of technical approaches for building vehicles that can exceed 100 MPG. As a result, a wide variety of devices and components are being used and integrated in ways that demand a flexible means for gathering data from such devices and components. To this end, the two-way vehicle communication system disclosed herein can be utilized to facilitate this project.

Figure 2:
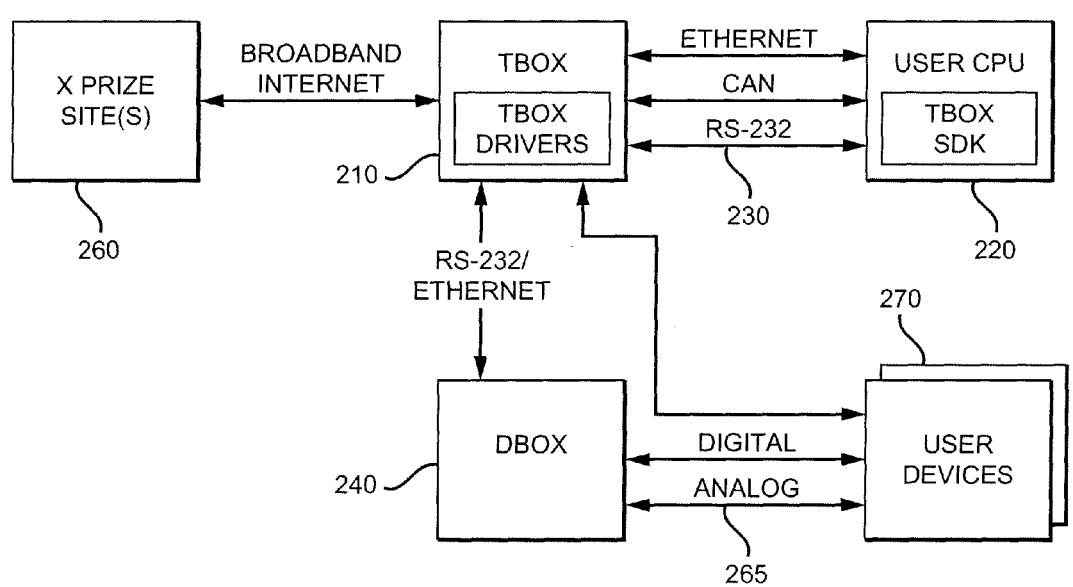
FIG. 2 shows a contemplated basic real-world application of the two-way vehicle communication system 200 for gathering data from such devices and components.

FIG. 2 depicts the basic approach for gathering data from such devices and components. A low-cost general-purpose x86 computer (TBox 210) is proposed for providing a few core interfaces with which team computers (User CPUs 220) can communicate and provide data. Interface options such as Ethernet, CAN, and RS-232 230 will be exposed to such User CPUs 220 from the TBox 210. A Java-based and C++-based SDK (not shown) is also specified to provide teams with a higher-level and more rapid means for integrating with a supplied TBox 210.

Whereas some teams will have ready access to device data, lack of programming expertise may be prohibitive. An optional general-purpose data acquisition device (DBox 240) may alternately be used by teams to provide analog and digital interfaces 265 to connected devices 270. In cases where a team has neither the software nor hardware means to interface with their sensed devices, the TBox 210 will be designed to support the use of custom software drivers. Finally, a mobile broadband Internet card solution 250 is proposed for integration with the TBox 210 for remote communication with X Prize Internet tracking sites 260.

PRI has an existing patent pending general-purpose robotics and automation software platform, trade named MAX, which facilitates the rapid development and deployment of such an architecture. PRI is able to specify such a flexible architecture and approach with a ready-made realization of such configurations in mind. PRI's approach is thus to work with the X Prize community to define detailed software interfaces that are supported with a ready-made solution. Such a MAX-based software architecture supports integration with a wide variety of sensors and devices. Data such as emissions, miles traveled, power source utilization, GPS data, camera images, and blog entries are readily configurable using MAX and the hardware architecture defined in this proposal. Because MAX is a Java-based software platform, existing widgets for prototyping an eco-feedback indicator may also be offered for use both onboard the vehicle and on the X Prize Web site itself.

Thus, specific embodiments, applications and methods of using a two-way vehicle communications system, otherwise known as an intelligent vehicle dashboard, have been disclosed. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

We claim:

1. A two-way vehicle communication system, comprising:
   at least one vehicle,
   at least one vehicle data collection point,
   at least one operations data supply system, and
   at least one data communication system, wherein the at least one data communication system is operatively coupled to the at least one vehicle, the at least one vehicle data collection point, the at least one operations data supply system or a combination thereof.

2. The two-way vehicle communication system of claim 1, wherein the at least one vehicle comprises a hybrid vehicle, a solar vehicle or an electric vehicle.

3. The two-way vehicle communication system of claim 1, wherein the at least one vehicle data collection point comprises a computer, handheld device, software system, network system, the Internet or a combination thereof.

4. The two-way vehicle communication system of claim 1, wherein the at least one operations data supply system comprises information regarding the fuel system, the computer system, the operations system or a combination thereof.

5. The two-way vehicle communication system of claim 1, wherein the at least one data communication system comprises software, hardware or a combination thereof wherein the at least one vehicle communication system and the at least one vehicle can communication with one another.

6. The two-way vehicle communication system of claim 1, wherein the system comprises a LincVolt Intelligent Dashboard.

7. The two-way vehicle communication system of claim 1, wherein the two-way system comprises a LincVolt Energy Saver.

8. A method of monitoring a vehicle using a two-way vehicle communication system, comprising:
   providing at least one vehicle,
   providing at least one vehicle data collection point,
   providing at least one operations data supply system, and
   providing at least one data communication system, wherein the data communication system is operatively coupled to and communicates with the at least one vehicle, the at least one vehicle data collection point, the at least one operations data supply system or a combination thereof.

9. The method of claim 8, wherein the at least one vehicle comprises a hybrid vehicle, a solar vehicle or an electric vehicle.

10. The method of claim 8, wherein the at least one vehicle data collection point comprises a computer, handheld device, software system, network system, the Internet or a combination thereof.

11. The method of claim 8, wherein the at least one operations data supply system comprises information regarding the fuel system, the computer system, the operations system or a combination thereof.

12. The method of claim 8, wherein the at least one data communication system comprises software, hardware or a combination thereof wherein the at least one vehicle communication system and the at least one vehicle can communication with one another.

* * * * *